(12) United States Patent
Horn et al.

(10) Patent No.: US 6,228,006 B1
(45) Date of Patent: May 8, 2001

(54) MACHINING CENTER

(75) Inventors: Wolfgang Horn, Pleidelsheim; Dietrich Geiger, Grossbottwar, both of (DE)

(73) Assignee: Hüller Hille GmbH (DE)

( * ) Notice: Subject to any disclaimer, the term of this patent is extended or adjusted under 35 U.S.C. 154(b) by 0 days.

(21) Appl. No.: 09/380,359

(22) PCT Filed: Jan. 10, 1998

(86) PCT No.: PCT/EP98/00113

§ 371 Date: Nov. 10, 1999

§ 102(e) Date: Nov. 10, 1999

(87) PCT Pub. No.: WO98/38006

PCT Pub. Date: Sep. 3, 1998

(30) Foreign Application Priority Data

Feb. 28, 1997 (DE) ............................................. 197 08 096

(51) Int. Cl.[7] .................................................. B23Q 3/157
(52) U.S. Cl. ................................. 483/55; 483/58; 483/67
(58) Field of Search .................................. 483/14, 15, 63, 483/60, 67, 55, 56, 57, 58, 66; 29/33 P

(56) References Cited

U.S. PATENT DOCUMENTS

| | | | |
|---|---|---|---|
| 3,807,035 | * 4/1974 | Moorman et al. | 29/33 P |
| 3,999,664 | * 12/1976 | Frazier | 483/31 |
| 4,091,526 | * 5/1978 | Nakaso et al. | 483/35 |
| 4,156,962 | * 6/1979 | Haller | 483/67 |
| 4,185,376 | * 1/1980 | Johnstone | 483/14 |
| 4,344,221 | * 8/1982 | Pagani | 483/8 |
| 4,394,908 | * 7/1983 | Pinchemaille | 483/624 |
| 4,558,506 | * 12/1985 | Kielma | 29/33 P |
| 4,644,635 | * 2/1987 | Murai et al. | 29/799 |
| 4,779,336 | * 10/1988 | Inoue et al. | 29/799 |
| 4,835,837 | * 6/1989 | Babel | 483/60 |
| 4,845,835 | * 7/1989 | Schneider | 483/14 |
| 5,153,973 | * 10/1992 | Kitamura | 29/33 P |
| 5,242,359 | 9/1993 | Obrist . | |
| 5,281,194 | * 1/1994 | Schneider | 483/14 |
| 5,304,110 | 4/1994 | Obrist . | |

FOREIGN PATENT DOCUMENTS

| | | | |
|---|---|---|---|
| 2137841 | * 2/1972 | (DE) | 483/67 |
| 35 05 138 A1 | 11/1985 | (DE) . | |
| 0242993 | * 2/1987 | (DE) | 483/67 |
| 566763 A1 | * 4/1992 | (DE) | 483/66 |
| 41 18 074 A1 | 12/1992 | (DE) . | |
| 41 18 108 A1 | 12/1992 | (DE) . | |
| 195 04 368 A1 | 8/1996 | (DE) . | |
| 195 14 058 A1 | 10/1996 | (DE) . | |
| 0 648 574 A1 | 4/1995 | (EP) . | |
| 2 167 325 | 5/1986 | (GB) . | |
| 0196344 | * 8/1988 | (JP) | 483/56 |

OTHER PUBLICATIONS

Hüller Hille, *Das Zweispindlige CNC–Bearbeitungszentrum nb–h twin*.

\* cited by examiner

*Primary Examiner*—William Briggs
(74) *Attorney, Agent, or Firm*—Mc Glew & Tuttle, P.C.

(57) ABSTRACT

The invention relates to a machining center, wherein at least one work spindle with a preferably horizontal spindle position can be displaced preferably in the direction of X, Y and Z and each work spindle is allocated at least one substantially circular tool store which can rotate around a central axis and which is provided with storage locations so that the working spindle(s) can deposit one or several tools. The invention is characterized in that a) the tool store (2) comprises one or several tool disk(s) (3) which are arranged parallel to each other and grouped together in a drum store, wherein b) the tool disk(s) can be individually or jointly rotated around a central axis (4) which is perpendicular to the spindle axis and c) the tools (5) can be inserted with their tips (6) forward into tool holders (7) in the tool store (2) which are arranged in a tangential to radical direction.

19 Claims, 6 Drawing Sheets

MACHINING CENTER

FIELD OF THE INVENTION

The present invention pertains to a machining center, wherein at least one working spindle with a preferably horizontal spindle position is displaceable preferably in the X, Y and Z directions and at least one essentially circular tool magazine rotatable around a central axis with storage places for depositing the tool or tools by the working spindle(s) is associated with each working spindle.

BACKGROUND OF THE INVENTION

Twin-spindle CNC machining centers (see, e.g., prospectus: Hüller Hille, nb-twin) with automatic tool changer, in which one or two tool magazine disks rotatable around a central horizontal axis are arranged on the side next to the working spindles, belong to the state of the art. The axis of rotation of these tool magazine disks is arranged in parallel to the longitudinal axis of the working spindles (spindle axis). Recesses for receiving the tools, whose longitudinal axes likewise extend in parallel to the axis of rotation of the tool magazine disks and of the working spindle, are arranged at the outer circumference of the tool magazine disks. These prior-art tool magazine disks require a relatively large space and can receive only a limited number of tools.

A machine tool with a plurality of spindles for the simultaneous or different, separate machining of a plurality of works, in which at least two spindles that can be driven around their axes of rotation are displaceable at least in their longitudinal axis (direction C) and in a direction at right angles thereto (direction X), has been known from DE 195 14 058 A1. A common multiple turret, which is tipped with tools associated with both tool spindles, is associated with the vertically arranged spindles. The tool turret comprises an essentially circular disk, on the circumference of which the tools are arranged with their tips to the outside. The tool turret is rotatable around an axis that is slightly tilted in relation to the horizontal direction. Only relatively few tools can be arranged on the tool turret in this case as well.

SUMMARY AND OBJECTS OF THE INVENTION

The primary object of the present invention is to provide a machining center of this type, which has a tool magazine with high storage density or with a considerably larger number of tools, wherein the tools can be deposited in a simple manner directly from the working spindle.

According to the invention, a machining center is provided wherein at least one working spindle with preferably horizontal spindle position is displaceable preferably in the X, Y and Z. At least one essentially circular tool magazine, which is rotatable around a central axis, is provided with storage places for depositing the tool or tools by the working spindle(s) and is associated with each working spindle. The tool magazine includes a tool disk or a plurality of tool disks, which are arranged in parallel to one another and are integrated in one drum magazine. The tool disk(s) is/are rotatable individually or together around a central axis arranged at right angles to the spindle axis. The tools with the tool tip can be pushed forward from the outside to the inside into the tool holders of the tool magazine. The central axes of the tool holders extend past the central axis of rotation of the said tool magazine.

The tool magazine according to the present invention comprises, e.g., in the case of horizontal spindle position, a plurality of tool disks arranged one on top of another with a common vertical axis of rotation and tool holders arranged on the circumference of the individual tool disks. The tool magazine, designed as a so-called drum magazine, is arranged in the vicinity of the working spindles such that the tools can be pushed into the tool holders and can be removed from these tool holders radially or in an essentially radially inwardly directed manner from the outside possibly only by displacing the working spindles. By simply rotating the drum magazine around the vertical axis, all the tool holders arranged on the circumference of a tool disk can be made accessible to the tip of the working spindle. In the case of, e.g., a plurality of working spindles arranged one on top of another, these can move simultaneously to the tool holders of two or more tool disks arranged one on top of another. Since the tool tips usually have a smaller diameter than the holders for the tools, considerably more tools can be accommodated on one tool disk, and the space can be utilized optimally.

In addition, a practically unlimited number of tool disks maybe arranged one on top of another.

Moreover, it has been found to be favorable to additionally arrange work holders for receiving works on the tool disk or on the tool magazine as well, wherein both the tool holders and the work holders can be brought by rotating the tool magazine into such a position that they are directly accessible from the tip of the working spindle. To achieve this, one or more tool magazines and optionally also one or more devices with work holders are arranged on a swinging or rotating device or on an NC turntable. A plurality of magazines for tools and/or works may be advantageously arranged on one turntable, one magazine being accessible for the working spindles, and, e.g., another magazine being in a position for loading and unloading the tools and/or works. Work holders and tool holders may also be interchanged with one another in their positions, preferably on one tool disk.

Furthermore, the tool magazines may also be picked up and/or moved according to the present invention by a pallet swinging device for the tools or by a separate NC turntable with or without a pallet swinging device.

To increase the security against fracture, it has proved to be favorable to arrange predetermined breaking points on the tool and work holders to protect the entire tool disk or even the drum magazine from damage in the case of possible errors in operation or other malfunctions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
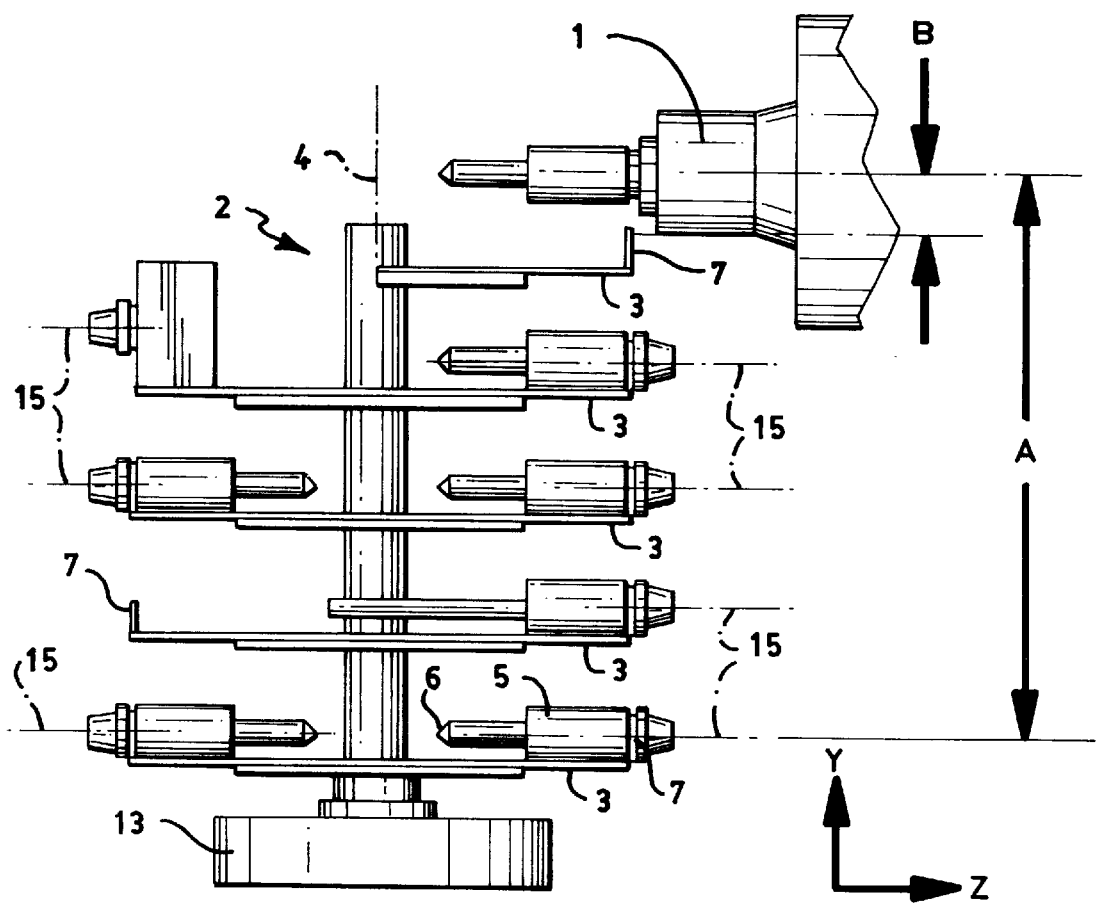
FIG. 1 is a side view of a tool magazine according to the present invention.

Referring to the drawings in particular, The figures show only the front tip of a working spindle 1. This working spindle 1 with horizontal spindle position can usually be displaced in a vertical rectangular frame in the vertical and/or horizontal direction (X and Y directions) by the work stroke A. In addition, the working spindle 1 is displaceable in its longitudinal direction (Z direction) for machining and also for depositing the tools 5 on the tool holders 7.

Figure 2:
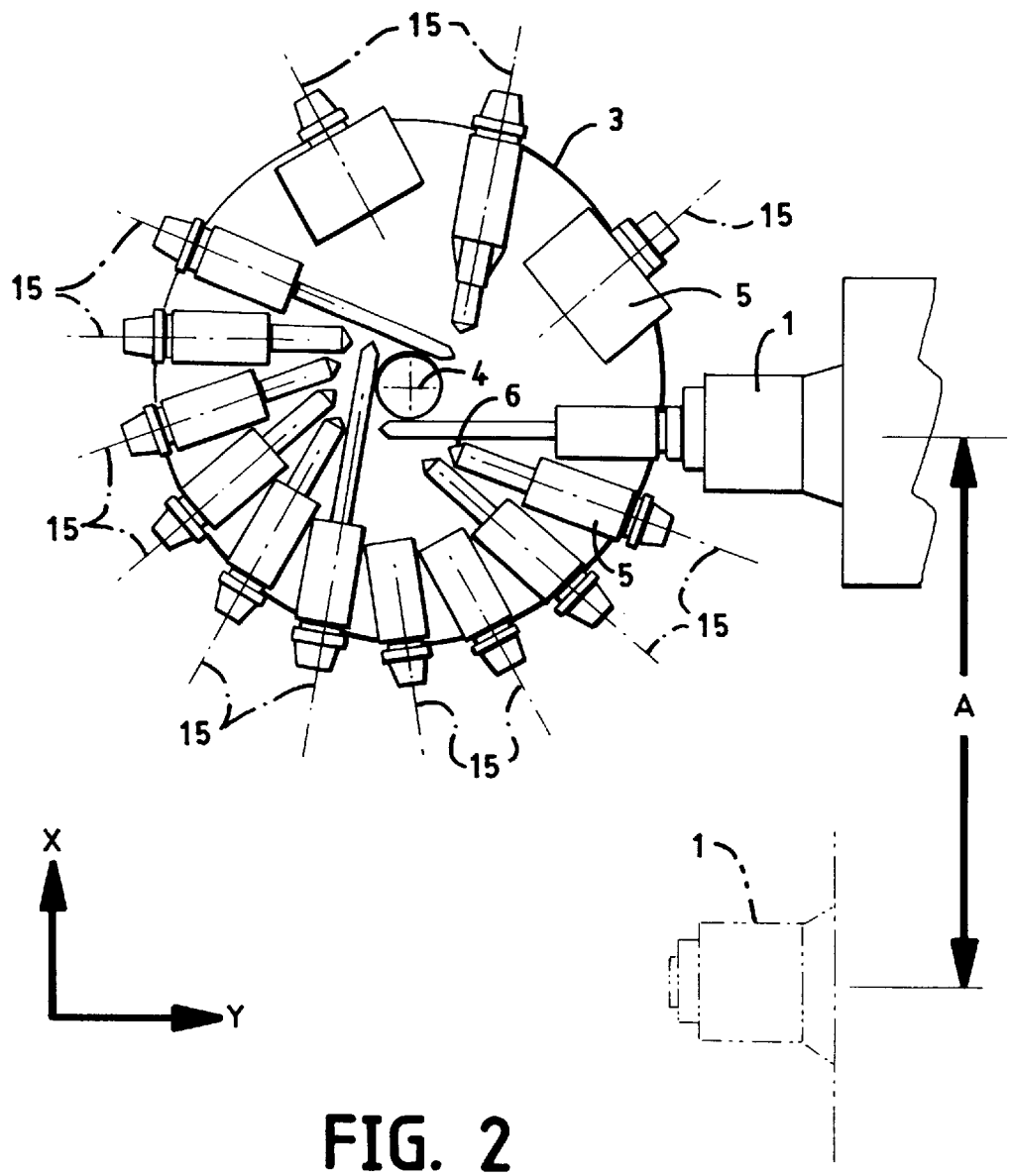
FIG. 2 is a top view of FIG. 1.

The tool magazine 2, which comprises a plurality of usually circular tool disks 3 arranged in parallel one of top of another, is arranged according to the present invention outside the area in which the works 12 are normally machined. The turret-like tool magazine 2 has a vertical, central axis of rotation 4. In the vertical spindle position of the working spindle 1, which is not shown but also belongs to the present invention, this central axis of rotation 4 would be arranged horizontally. Each tool disk 3 has on its outer circumference a plurality of tool holders 7 for receiving the tools 5 or also the works 12. As can be seen especially in FIG. 2, the tools 5 and tool axis 15 are arranged on the tool disk 3 with their tool tips 6 pointing radially or approximately radially inward. Since the tool carriers and the connection ends thereof usually have a larger diameter than the tool tip, considerably more tools 5 can be arranged on this tool disk 3 than in the case of the arrangement of the tools in a tool turret, in which the tool tips point radially outwardly. For the tool change, the working spindle 1 is first displaced according to the present invention in the X and Y directions into the position located in front of the particular tool holder 7, after which it is moved in the Z direction between the tool disks 3 to above the tool holder 7 and is finally lowered by a short stroke B into the fork-shaped tool holder 7. After the tool-clamping device has been loosened and the working spindle has been withdrawn, the tool magazine 2 is rotated around its axis of rotation 4 to the extent that the working spindle 1 can grasp a new tool 5.

Figure 3:
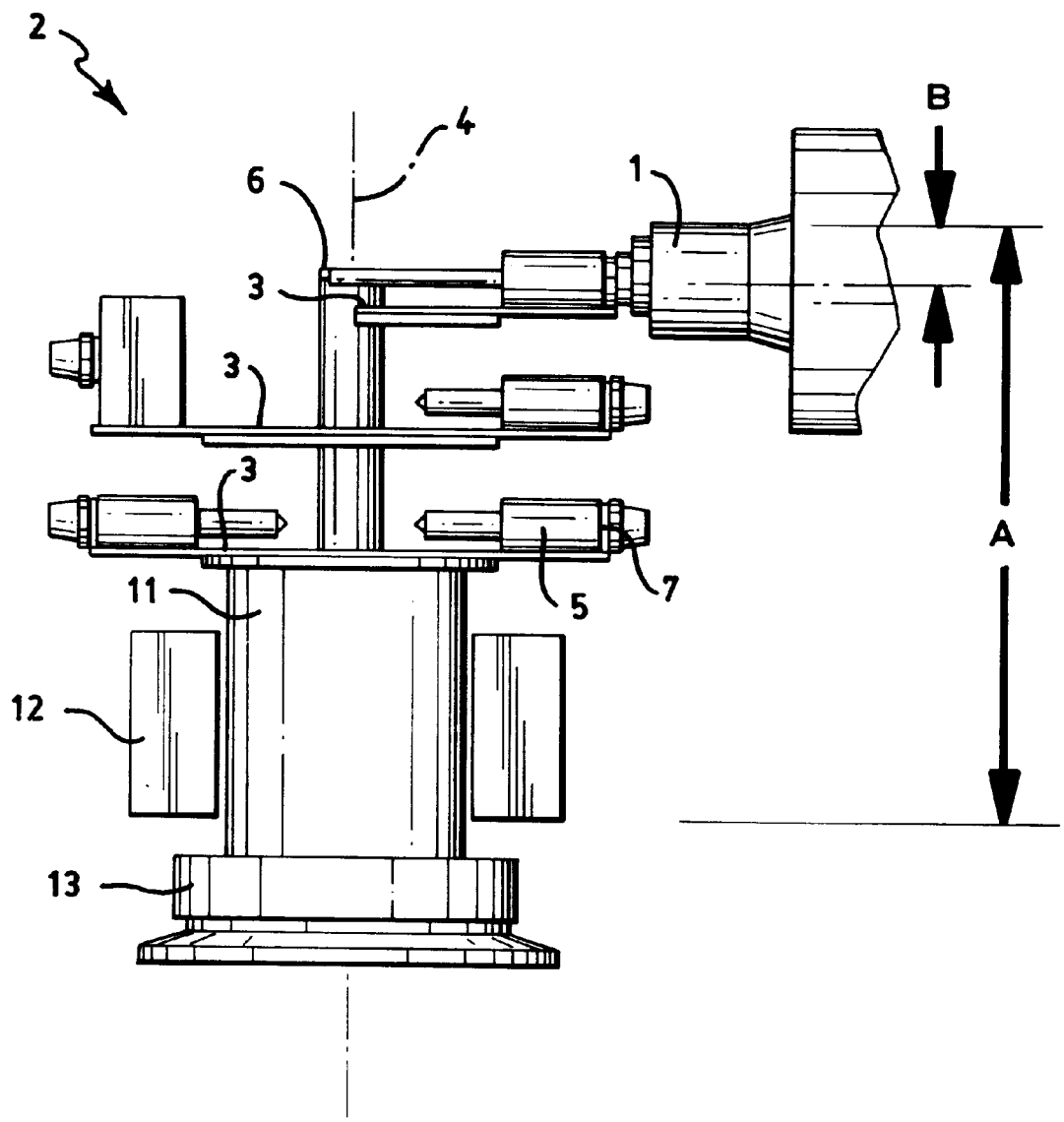
FIG. 3 is an alternative to FIG. 1, in which works 12 are additionally shown on work holders 11.

According to FIG. 3, work holders 11 with suitable work-mounting devices are additionally arranged on the tool magazine 2 next to the tool disks 3, so that the works 12 can be inserted radially from the outside and can be also machined there directly by means of the tools 5 arranged on the working spindle 1.

Figure 4:
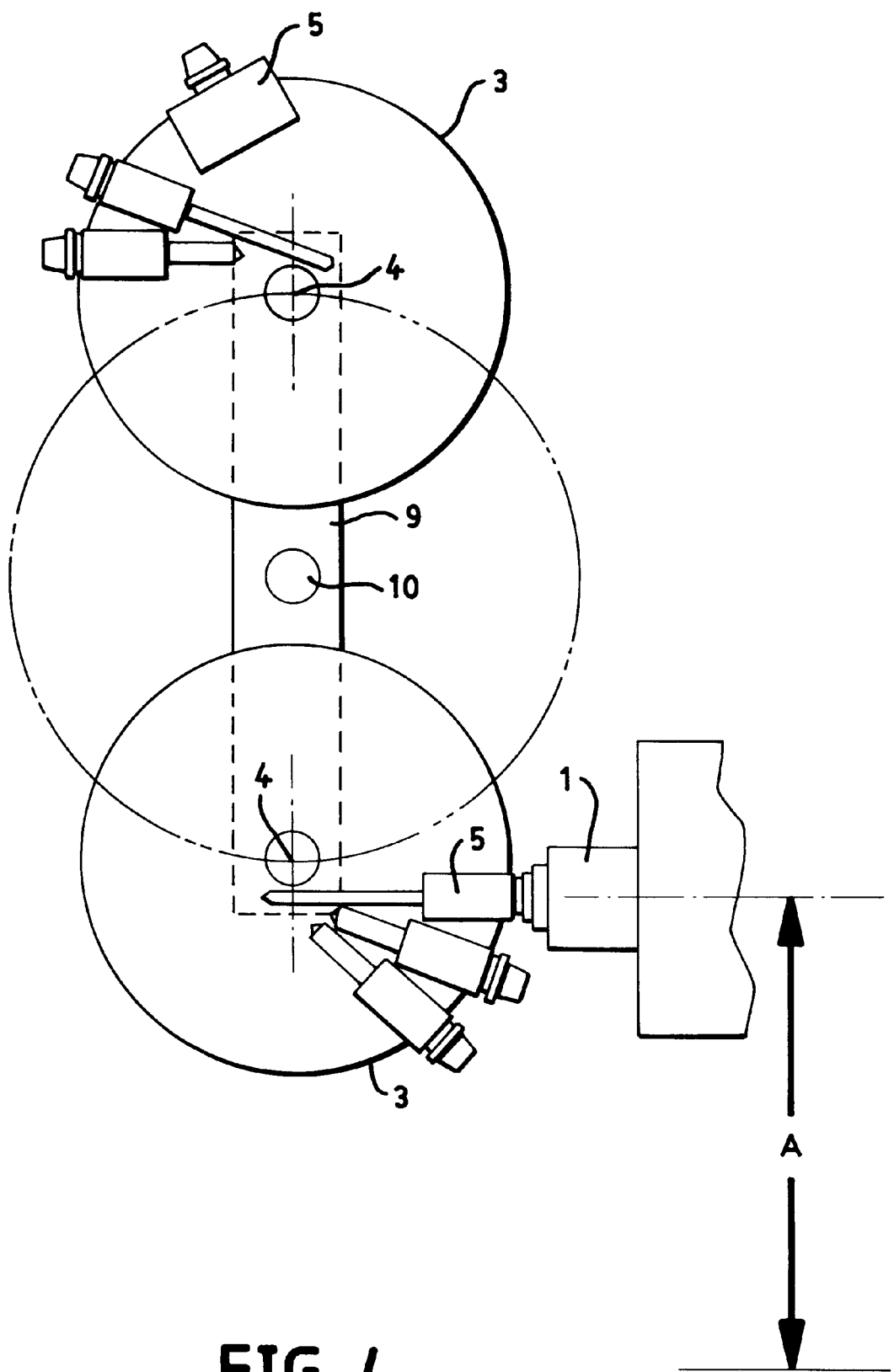
FIG. 4 is a top view of two tool magazines, which are rotatable on a swinging or rotating device 9 around a vertical axis of rotation 10.
Figure 5:
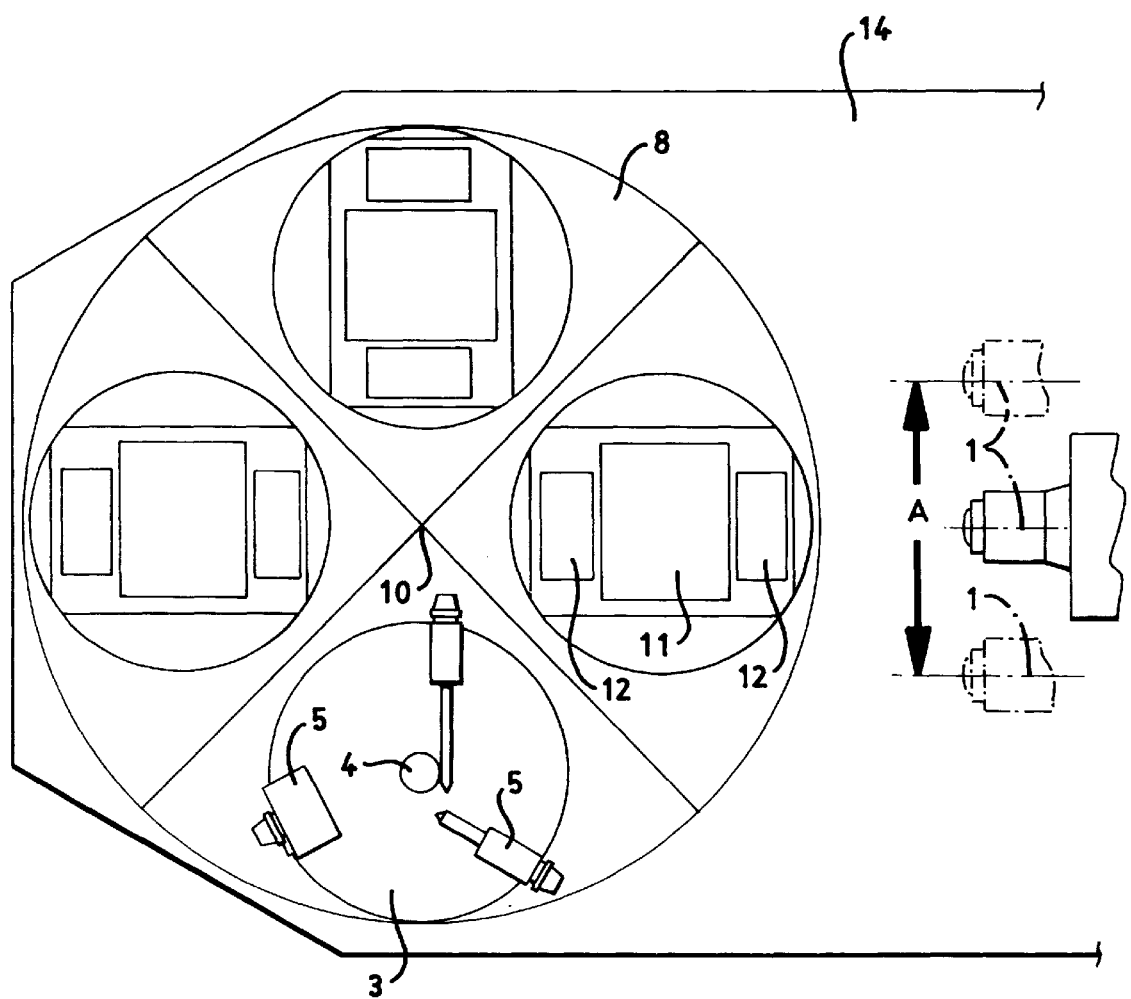
FIG. 5 is a top view of an arrangement of four magazines on a turntable 8, wherein the tools 5 on a tool disk 3 and the works 12 on work holders 11 are shown.
Figure 6:
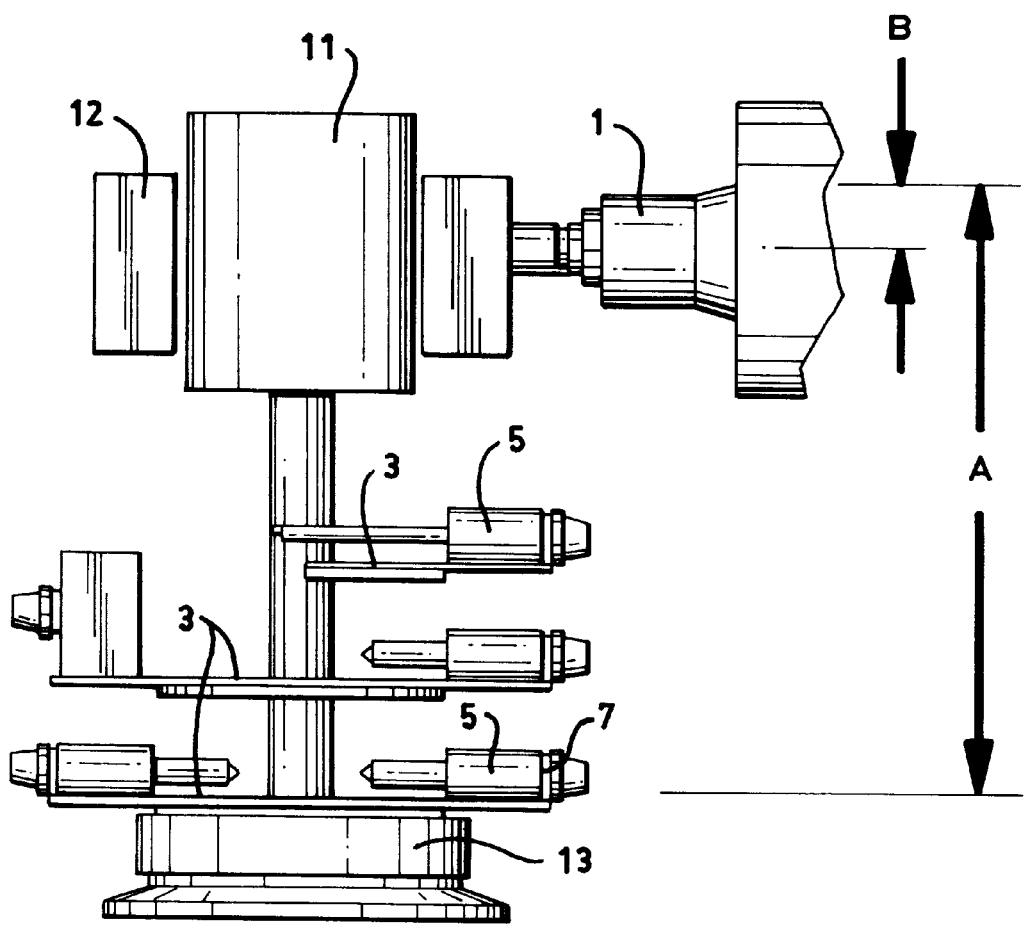
FIG. 6 is a side view of the tool magazine of FIG. 3 showing the tool holders and the work holders being interchanged with one another.

Each tool magazine 3 is mounted on a fastening means 13 via the axis of rotation 4. These fastening means 13 may in turn be fastened to a swinging or rotating device 9 (see FIG. 4) or on a turntable 8, wherein the turntable 8 and the swinging or rotating device 9 is mounted rotatably around the vertical axis of rotation 10 on a baseplate 14.

The figures always show only one working spindle 1. However, a plurality of working spindles arranged in parallel to one another, which preferably machine one or more works at the same time and especially also pick up their tools 5 from the tool holders 7 on different tool disks 3 arranged one on top of another and deposit them to these tool disks simultaneously, may also be present.

While specific embodiments of the invention have been shown and described in detail to illustrate the application of the principles of the invention, it will be understood that the invention may be embodied otherwise without departing from such principles.

What is claimed is:

1. A machining center, comprising:
   a working spindle displaceable in more than one direction, said working spindle having a spindle axis;
   a tool magazine with storage places for depositing tools by the working spindle, said circular tool magazine being rotatable around a central axis and being associated with said working spindle, said tool magazine including a drum magazine with integrated tool disks arranged in parallel to one another, said tool disks being rotatable individually or together around said central axis arranged at right angles to said spindle axis;
   a plurality of tool holders connected to each of said disks, each of said tool holders having a central axis substantially parallel with said tool disks, and configured so that tools with a connection end for connecting to said spindle and a tip on an opposite end of said each tool may be pushed tip first into said tool holders from a radial outside to a radial inside of said tool magazine along said central axis of said tool holders by said working spindle, said central axis of each said tool holders not intersecting said central axis of rotation of said tool magazine.

2. A machining center, comprising:
   a tool disk for storing tools, said tool disk being rotatable about a central axis, each of the tools having a tool axis, a connection end and a tip end, said tool disk having an outer circumference;
   a plurality of tool holders arranged on said outer circumference of said tool disk, each of said tool holders holding a respective tool with a respective tool axis substantially parallel with a plane defined by said tool disk, said tool axis being spaced from said central axis of said tool magazine, said plurality of tool holders being configured for holding said tools with their tip ends to have said tools extend inward from said outer circumference of said tool disk;
   a working spindle movable between a machining position and said tool disk, said working spindle engaging and disengaging with the tools at said tool disk, said working spindle using the tools in said machining position for machining a workpiece, said working spindle having a spindle axis arranged substantially perpendicular to said central axis of said tool disk.

3. The machining center in accordance with claim 2, further comprising:
   a plurality of said tool disks arranged substantially parallel to each other, said plurality of disks being rotatable about said central axis and forming a tool magazine.

4. The machining center in accordance with claim 2, wherein:
   said tool axes and said central axis of said tool magazine are skewed with respect to each other.

5. A machining center in accordance with claim 2, wherein:
   said tool axis is arranged on said tool disk at a tool angle between a radial angle and a tangential angle of said tool disk.

6. A machining center in accordance with claim 5, wherein:
   said tool angle is not equal to either one of said tangential angle and said radial angle.

7. A machining center in accordance with claim 2, wherein:
   a subset of said plurality of tools are positioned on said tool disk with each of said subset of tools extending more than halfway across said disk.

8. A machining center, comprising:
- a horizontally disposed working spindle displaceable in the X, Y and Z directions, said working spindle having a spindle axis;
- a substantially circular tool magazine with storage places for depositing tools by the working spindle, said substantially circular tool magazine being rotatable around a central axis and being associated with said working spindle, said tool magazine including a drum magazine with integrated tool disk or a plurality of tool disks arranged in parallel to one another, said tool disk or said plurality of tool disks being rotatable individually or being rotatable together around said central axis arranged at right angles to said spindle axis;
- tool holders connected to said substantially circular tool magazine, each of said tool holders having a central axis substantially parallel with said tool disk; and
- tools with a connection end for connecting to said working spindle and having a tip on an opposite end of said each tool, said tool holders being configured for receiving each of said tools pushed tip first into said tool holders from a radial outside to a radial inside of said tool magazine along said central axis of said tool holders by said working spindle, said central axis of each said tool holders extending past said central axis of rotation of said tool magazine.

9. The device in accordance with claim 8, further comprising work holders arranged on said tool disk;
- said tool magazine having an outer circumference, said plurality of tool holders holding said tools to have said tools extend radially inward from said outer circumference.

10. The device in accordance with claim 8, further comprising: another tool magazine arranged on a swinging or rotating device or on a turntable;
- each of said tools having a tool axis extending from said connection end to said tip said tool axis being arranged on said tool magazine at a tool angle between a radial angle and a tangential angle of said tool magazine, said tool angle being less than said radial angle and closer to said radial angle than said tangential angle;
- a subset of said plurality of tools are positioned on said tool magazine with each of said subset of tools extending more than halfway across said magazine and beyond said cental axis of said tool magazine, said tips of said subset of tools being positioned adjacent said central axis;
- said working spindle rotating about said spindle axis, said each of said tools rotates with said spindle about a respective said tool axis when machining a workpiece.

11. The device in accordance with claim 9, further comprising:
- another tool magazine arranged together with said work holders on a swinging or rotating device or on a turntable.

12. The device in accordance with claim 9, wherein one of said tool holders and said work holders can be interchanged with one another.

13. A machining center in accordance with claim 2, wherein:
- a subset of said plurality of tools are positioned on said tool disk with each of said subset of tools extending beyond said cental axis of said tool disk.

14. A machining center in accordance with claim 2, wherein:
- each of said tools has a connection end for connecting to said spindle and having a tip on an opposite end of said each tool, said tool axis extending from said connection end to said tip, said tips of said tools being arranged adjacent said central axis of said tool disk;
- said working spindle rotates about said spindle axis, said each of said tools rotates with said spindle about a respective said tool axis when machining the workpiece.

15. A machining center in accordance with claim 5, wherein:
- said tool angle is closer to said radial angle than said tangential angle.

16. The machining center in accordance with claim 1, further comprising a work holder arranged on at least one of said disks;
- said tool disks having an outer circumference, said plurality of tool holders holding said tools to have said tools extend inward from said outer circumference.

17. The machining center in accordance with claim 11, further comprising a carrying element including one of a swinging device, a rotating device and a turntable wherein said tool magazine is arranged on said swinging device, on said rotating device or on said turntable;
- each of said tools having a tool axis extending from said connection end to said tip, said tool axes being arranged on said tool magazine at a tool ankle between a radial angle and a tangential angle of said tool magazine, said tool angle being less than said radial angle and closer to said radial angle than said tangential angle;
- a subset of said plurality of tools are positioned on said tool magazine with each of said subset of tools extending more than halfway across said magazine and beyond said cental axis of said tool magazine, said tips of said subset of tools being positioned adjacent said central axis of said tool magazine;
- said working spindle rotating about said spindle axis, said each of said tools rotates with said spindle about a respective said tool axis when machining a workpiece.

18. The machining center in accordance with claim 16, wherein said tool magazine is arranged together with said work holder on a swinging device, on a rotating device or on a turntable.

19. The machining center in accordance with claim 16, wherein one of said tool holders and said work holder can be interchanged with one another.

* * * * *